United States Patent
McClure et al.

(10) Patent No.: US 7,546,434 B2
(45) Date of Patent: Jun. 9, 2009

(54) METHOD TO WRITE DATA TO AN INFORMATION STORAGE AND RETRIEVAL SYSTEM

(75) Inventors: Alan G. McClure, Sahuarita, AZ (US); William F. Micka, Tucson, AZ (US); Warren K. Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/158,614

(22) Filed: Jun. 22, 2005

(65) Prior Publication Data

US 2006/0294332 A1    Dec. 28, 2006

(51) Int. Cl.
*G06F 12/00* (2006.01)
*G06F 13/00* (2006.01)
*G06F 13/28* (2006.01)

(52) U.S. Cl. ........................................... 711/167
(58) Field of Classification Search ................. 711/167
See application file for complete search history.

(56) References Cited

U.S. PATENT DOCUMENTS

| 5,926,834 A * | 7/1999 | Carlson et al. ............... 711/152 |
| 5,991,835 A * | 11/1999 | Mashimo et al. ............... 710/58 |
| 2004/0030837 A1 * | 2/2004 | Geiner et al. ............... 711/133 |

* cited by examiner

*Primary Examiner*—Sheng-Jen Tsai
*Assistant Examiner*—Matthew R Chrzanowski
(74) *Attorney, Agent, or Firm*—Dale F. Regelman; Quarles & Brady LLP

(57) ABSTRACT

A method is disclosed to write data to an information storage and retrieval system comprising (n) volumes and a data cache, where that information storage and retrieval system is capable of communicating with one or more host computers. The method receives from a host computer an update for the (i)th volume, and determines the (i)th delay, where that (i)th delay is associated with the (i)th volume. The method then writes the update to said data cache interposing the (i)th delay without indicating to said host computer that the information storage and retrieval system is unavailable.

3 Claims, 3 Drawing Sheets

METHOD TO WRITE DATA TO AN INFORMATION STORAGE AND RETRIEVAL SYSTEM

FIELD OF THE INVENTION

This invention relates to an apparatus and method to write data to an information storage and retrieval system.

BACKGROUND OF THE INVENTION

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASDs can store gigabytes of data, and the access to such data is typically measured in milliseconds, i.e. orders of magnitudes slower than electronic memory. Often, this second level of data storage is performed by a data storage and retrieval system interconnected to one or more host computer systems.

Such data storage and retrieval systems receive requests to write information to one or more data storage devices, and requests to retrieve information from those one or more data storage devices. Upon receipt of a write request, the system stores information received from a host computer in a data cache. In certain implementations, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

Having a backup data copy is mandatory for many businesses for which data loss would be catastrophic. Primary data is periodically provided from a primary information storage and retrieval system to a secondary information storage and retrieval system. Such primary data is backed-up by making a copy on, for example, tape or library storage at the remote storage location.

SUMMARY OF THE INVENTION

Applicants' invention comprises an apparatus and method to write data to an information storage and retrieval system comprising (n) volumes and a data cache, where that information storage and retrieval system is capable of communicating with one or more host computers. Applicants' method receives from a host computer an update for the (i)th volume, and determines the (i)th delay, where that (i)th delay is associated with the (i)th volume. The method then writes the update to said data cache interposing the (i)th delay without indicating to said host computer that the information storage and retrieval system is unavailable.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in a data processing system that comprises one or more host computers, one or more primary information storage and retrieval systems, and one or more secondary information storage and retrieval systems. The following description of Applicants' apparatus and method is not meant, however, to limit Applicants' invention to data processing applications, as the invention herein can be applied generally to coordinating the flow of information into and out of a storage medium.

Figure 1:
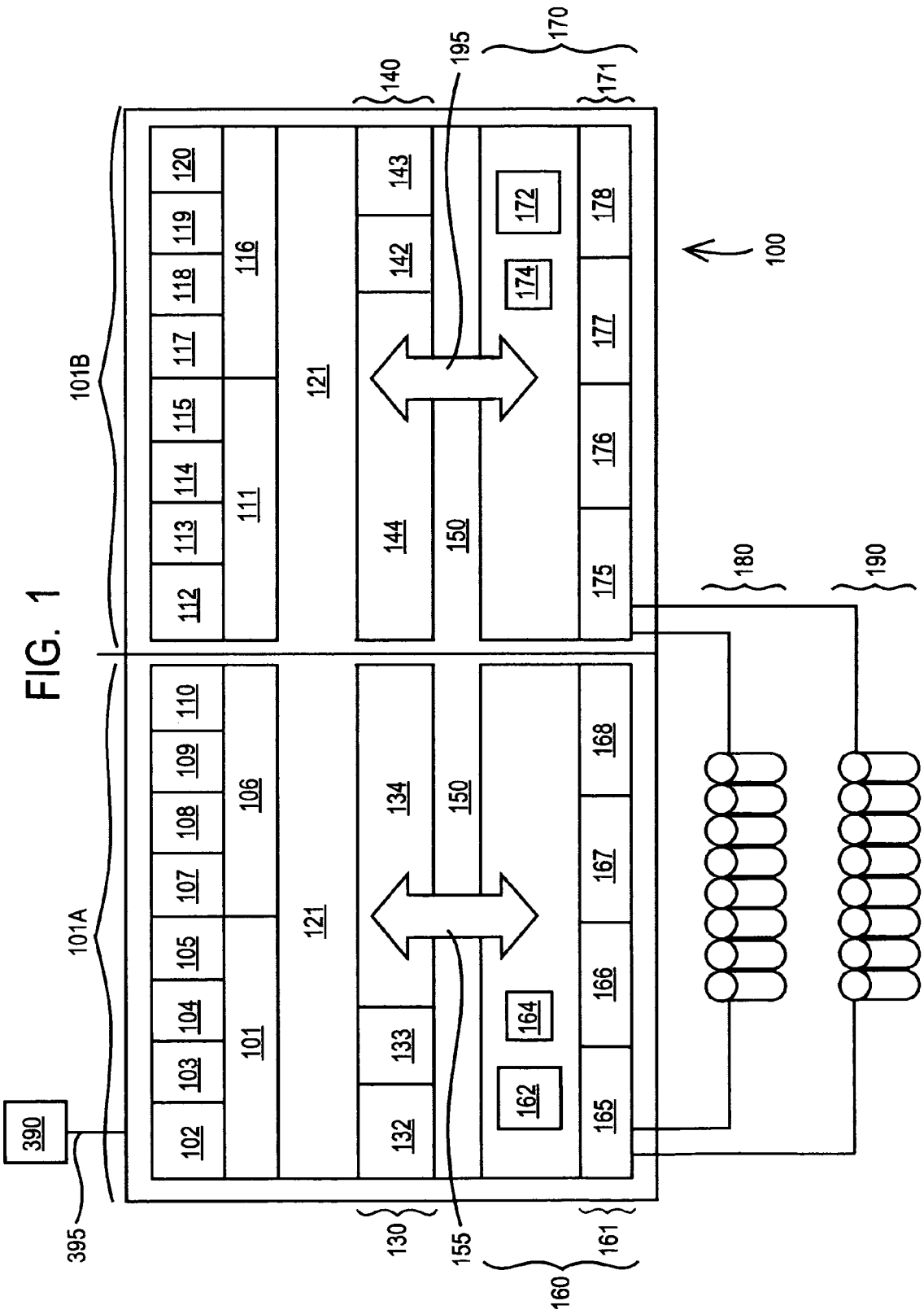
FIG. 1 is a block diagram showing one embodiment of Applicants' data storage and retrieval system.

Referring now to FIG. 1, information storage and retrieval system 100 is capable of communication with host computer 390 via communication link 395. Communication link 395 is selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapters 101A which includes adapters 102-105 and 107-110; and a second plurality of host adapters 101B which includes adapters 112-115 and 117-120. In other embodiments, Applicants' information storage and retrieval system includes fewer than 16 host adapters. In still other embodiments, Applicants' information storage and retrieval system includes more than 16 host adapters. Regardless of the number of host adapters disposed in any embodiments of Applicants' system, each of those host adapters comprises a shared resource that has equal access to both central processing/cache elements 130 and 140.

Each host adapter utilizes a host communication protocol such as a Fibre Channel, FICON, ESCON, SCSI, iSCSI, Infiniband, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprise nonvolatile storage ("NVS") 172 and battery backup 174 for NVS 172.

In certain embodiments of Applicants' system, one or more host adapters 101, processor portion 130, and one or more device adapters 161, are disposed on a first card disposed in Applicants' information storage and retrieval system. Similarly, in certain embodiments, one or more host adapters 111, processor portion 140, and one or more device adapters 171, are disposed on a second card in Applicants' information storage and retrieval system.

In the illustrated embodiment of FIG. 1, sixteen data storage devices are organized into two arrays, namely array 180 and array 190. Each such storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
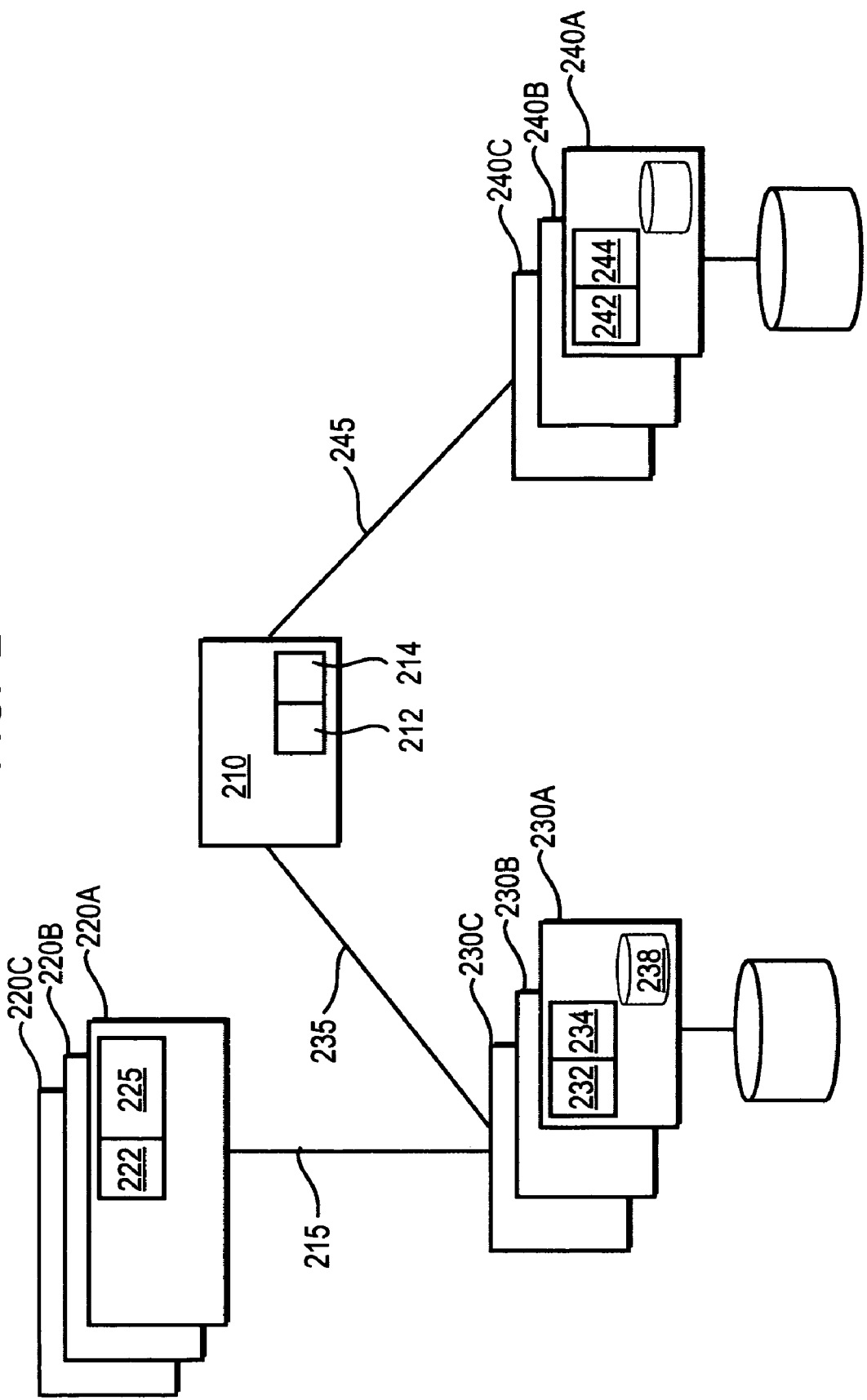
FIG. 2 is a block diagram showing a second embodiment of the data storage and retrieval system of FIG. 1 comprising three switch domains, each of which comprises one or more data storage devices.

FIG. 2 shows one embodiment of Applicants' data processing system. Referring now to FIG. 2, system 200 includes one or more primary information storage and retrieval systems 230. In certain embodiments, one or more of those information storage and retrieval systems 230 comprise information storage and retrieval system 100. In the illustrated embodiment of FIG. 2, system 200 comprises three information storage and retrieval systems. In other embodiments, system 200 comprises fewer than three information storage and retrieval systems. In still other embodiments, system 200 comprises more than three information storage and retrieval systems.

The one or more information storage and retrieval systems are capable of bidirectional communication with one or more information sources, such as sources 220A, 220B, and 220C. In certain embodiments, the one or more information sources 220 comprise host computers, such as for example host 390 (FIG. 1). In certain embodiments, the one or more information sources 220 are interconnected with each of the one or more primary information storage and retrieval systems 230 via one or more communication links 215, such as for example communication link 395 (FIG. 1).

In certain embodiments of Applicants' apparatus and method, each host computer comprises a storage management program, such as storage management program 225. In certain embodiments, storage management program 225 comprises an IBM DFSMS algorithm. In certain embodiments, that IBM DFSMS is implemented in the IBM MVS operating system.

In certain embodiments, Applicants' system 200 further comprises a system data mover 210. For example, embodiments of Applicants' method implemented in an Extended Remote Copy ("XRC") operation include use of Applicants' system data mover. Chapter 5 of the IBM Redbook publication entitled Implementing ESS Copy Services with IBM eServer zSeries, September 2003, describes such an XRC method, and is hereby incorporated herein. Applicants' system data mover 210 is capable of communicating with one or more primary information storage and retrieval systems, such as systems 230A, 230B, and 230C, and with one or more secondary information storage and retrieval systems, such as systems 240A, 240B, and 240C. System data mover 210 reads information from one or more primary information storage and retrieval systems, and provides that information to one or more secondary information storage and retrieval systems.

In the illustrated embodiment of FIG. 2, system data mover 210 is disposed external to the one or more information sources 220, and external to the one or more primary information storage and retrieval systems 230. In the illustrated embodiment of FIG. 2, data system mover 210 comprises controller 212 and functions/instructions 214.

In other embodiments of Applicants' data processing system, system data mover 210 comprises a portion of Applicants' storage management program 225. In these embodiments, Applicants' one or more primary information storage and retrieval systems 230 are capable of communicating with one or more secondary information storage and retrieval systems 240 via one or more communication links 245.

In still other embodiments of Applicants' data processing system, system data mover 210 comprises functions/instructions 234 disposed in each of Applicants' primary information storage and retrieval systems 230. In these embodiments, instructions/functions 234 are performed by controller 232. In these embodiments, Applicants' one or more primary information storage and retrieval systems 230 are capable of communicating with one or more secondary information storage and retrieval systems 240 via one or more communication links 245.

In the illustrated embodiment of FIG. 2, system data mover 210 is interconnected with primary information storage and retrieval systems 230 via one or more communication links 235. The one or more communication links 235 are selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the illustrated embodiment of FIG. 2, system data mover 210 is interconnected with secondary information storage and retrieval systems 240 via one or more communication links 245. The one or more communication links 245 are selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, one or more of communication links 235, and/or one or more of communication links 245, are compliant with one or more of the embodiments of IEEE Specification 802.11 (collectively the "IEEE Specification"). As those skilled in the art will appreciate, the IEEE Specification comprises a family of specifications developed by the IEEE for wireless LAN technology.

Figure 3:
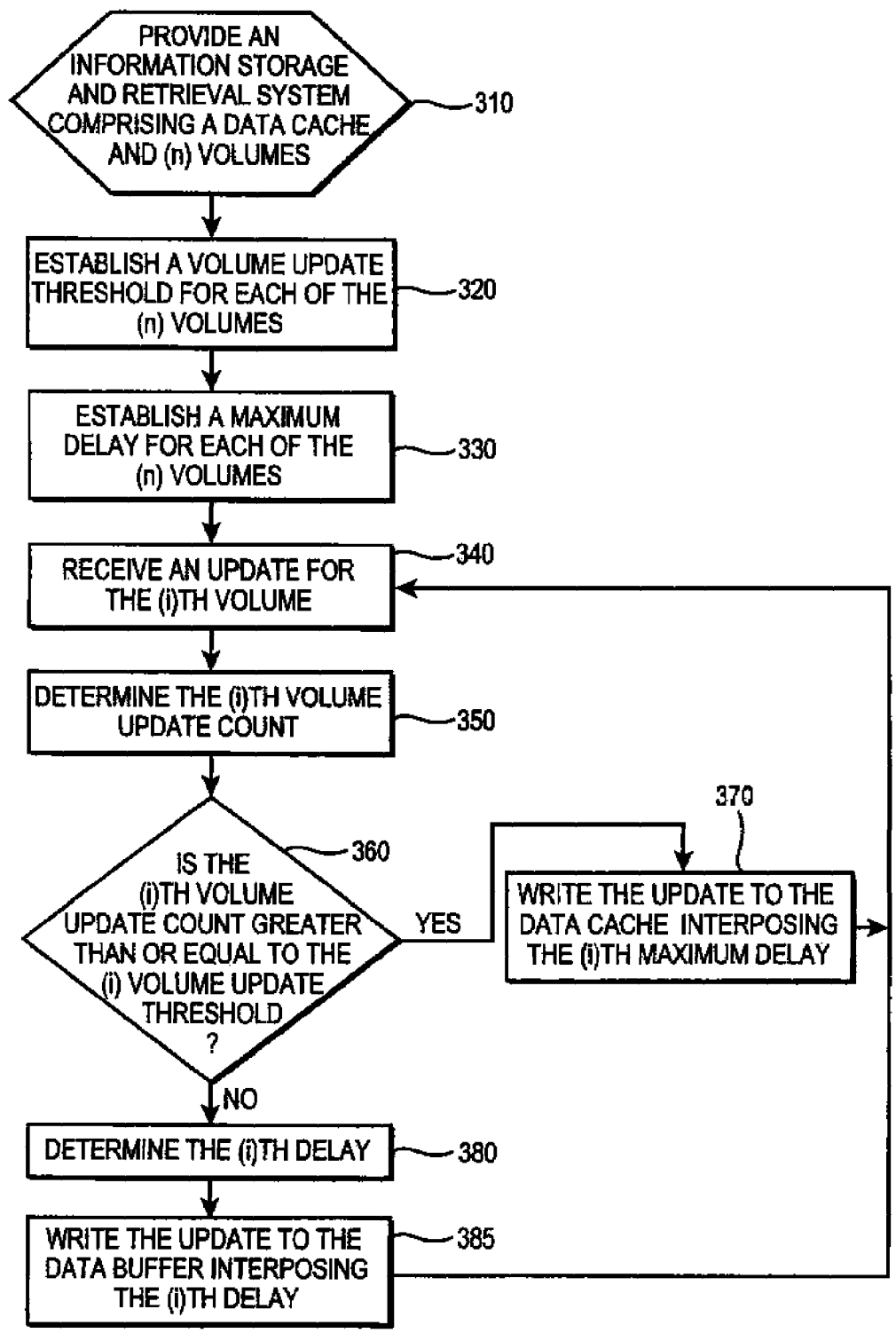
FIG. 3 is flow chart summarizing the steps in Applicants' method.

FIG. 3 summarizes the steps of Applicants' method. Referring now to FIG. 3, in step 310 Applicants' method provides an information storage and retrieval system comprising (n) volumes and a data cache, such as for example data cache 134 (FIG. 1), or 144 (FIG. 1), or 238 (FIG. 2). The information storage and retrieval system of step 310 is capable of receiving data from one or more host computers, and writing that data to the data cache at a variable write rate.

Step 310 further comprises providing a system data mover capable of bidirectional communication with the primary information storage and retrieval system. In certain embodiments, the system data mover of step 310 is disposed external to the primary information storage and retrieval system of step 310. In other embodiments, the system data mover of step 310 is integral with the primary information storage and retrieval system of step 310. In still other embodiments, the system data mover of step 310 is integral with a host computer capable of communicating with the primary information storage and retrieval system of step 310.

In certain embodiments, data comprising updates for the (n) volumes is received by one or more host adapters, such as host adapter 102 (FIG. 1), disposed in the information storage and retrieval system. Those updates are then written to the data cache. In certain embodiments, those updates are written as sidefiles to a designated sidefile portion of the data cache. Subsequently, the system data mover copies those sidefiles to a remote storage location. Thereafter, those copied sidefiles are removed from the sidefile portion of the data cache.

Sidefiles may be written to the data cache at a first rate, but copied from the data cache at a second rate, where the first rate is greater than the second rate. Applicants' method adjusts the rate at which sidefiles are written to the data cache to better match the rate at which those sidefiles are being removed from the data cache, without making the information storage and retrieval system unavailable to the host computers.

In step 320, Applicant's method establishes (n) volume update thresholds, wherein each of those (n) volume update thresholds is associated with a different one of the (n) volumes, i.e. the (i)th volume update threshold is associated with the (i)th volume, wherein (i) is greater than or equal to 1 and less than or equal to (n).

In certain embodiments, the (i)th volume update threshold is set by the host computer writing data to the (i)th volume. In other embodiments, the (i)th volume update threshold is set by the information storage and retrieval system. In still other embodiments, the (i)th volume update threshold is set by the system data mover.

In step 330, Applicants' method establishes (n) maximum interposed delays, wherein each of those (n) maximum delays is associated with a different one of the (n) volumes, i.e. the (i)th maximum delay is utilized when writing to the cache an update for the (i)th volume.

In certain embodiments, the (i)th maximum delay is set by the host computer writing data to the (i)th volume. In other embodiments, the (i)th maximum delay is set by the information storage and retrieval system. In still other embodiments, the (i)th maximum delay is set by the system data mover.

In certain embodiments, Applicants' method utilizes 16 delay levels, wherein each of those 16 levels comprises a specified interposed delay. In certain embodiments, step 330 comprises selecting as the (i)th maximum delay one of the 16 delay levels, and the associated interposed delay, recited in TABLE I.

TABLE I

| Delay Level | Interposed Delay |
|---|---|
| level 0 | no delay |
| level 1 | 1 ms every 50 writes |
| level 2 | 1 ms every 25 writes |
| level 3 | 1 ms every 10 writes |
| level 4 | 1 ms every 5 writes |
| level 5 | 1 ms every 2 writes |
| level 6 | 1 ms every write |
| level 7 | 2 ms every write |
| level 8 | 5 ms every write |
| level 9 | 10 ms every write |
| level 10 | 25 ms every write |
| level 11 | 50 ms every write |
| level 12 | 100 ms every write |
| level 13 | 250 ms every write |
| level 14 | 500 ms every write |
| level 15 | 1000 ms every write |

Steps 320 and 330 may be performed in any order. In addition, steps 320 and 330 may be performed at any time prior to step 340.

In step 340, Applicants' method receives an update for the (i)th volume. In certain embodiments, step 340 further comprises receiving said update by a host adapter disposed in the receiving information storage and retrieval system. In certain embodiments, step 340 further comprises generating an XRC record set comprising said update. In certain embodiments, step 340 is performed by the receiving information storage and retrieval system.

Applicants' method transitions from step 340 to step 350 wherein the method determines the (i)th volume update count, wherein the (i)th volume update count comprises the number of sidefiles associated with the (i)th volume written to the data cache. In certain embodiments, step 350 is performed by a host computer capable of communicating with the information storage and retrieval system. In still other embodiments, step 350 is performed by Applicants' system data mover.

In step 360, Applicants' method determines if the (i)th volume update count of step 350 is greater than or equal to the (i)th volume update threshold of step 320. In certain embodiments, step 360 is performed by a host computer capable of communicating with the information storage and retrieval system. In other embodiments, step 360 is performed by the information storage and retrieval system. In still other embodiments, step 360 is performed by Applicants' system data mover.

If Applicants' method determines in step 360 that the (i)th volume update count is greater than or equal to the (i)th volume update threshold, then the method transitions from step 360 to step 370 wherein the method writes the update received in step 340 to the data cache interposing the (i)th maximum delay. In certain embodiments, step 370 is performed by a host computer capable of communicating with the information storage and retrieval system. In other embodiments, step 370 is performed by the information storage and retrieval system.

If Applicants' method determines in step 360 that the (i)th volume update count is not greater than or equal to the (i)th volume update threshold, then the method transitions from step 360 to step 380 wherein the method determines the (i)th delay.

In certain embodiments, step 380 comprises selecting one of the delay levels, and the associated interposed delay, recited in Table I. In these embodiments, step 380 further comprises determining the (i) pacing level interval. In certain embodiments of Applicants' method, the (i) pacing level interval is determined using Equation (1).

$$(i)\text{th pacing interval} = (i)\text{th volume update threshold}/(i)\text{th maximum delay level} \quad (1)$$

In certain embodiments, step 380 then uses the (i)th pacing interval to determine the (i) delay level using Equation (2) with integer truncation.

$$(i)\text{th delay level} = (i)\text{th volume update count}/(i)\text{th pacing interval} \quad (2)$$

Applicants' method transitions from step 380 to step 385 wherein the method writes the update of step 340 as a sidefile to the data cache utilizing the (i)th Interposed Delay from Table I.

The following example is presented to further illustrate to persons skilled in the art how to make the invention, and to identify one preferred embodiment thereof. This example is not intended as a limitation, however, upon the scope of the invention which is defined by claims appended hereto.

EXAMPLE

If the (i)th volume update threshold is set to 100 sidefiles in step 320, and referring to Table I if the (i)th maximum delay level is set in step 330 to 5, then using Equation (1) Applicants' method sets the (i)th pacing interval equal to 20.

If the (i)th volume update count is determined in step 350 to be 45, and if the (i)th pacing interval is set to 20, then using Equation (2) Applicants' method in step 380 sets the (i)th Delay Level at 2. In step 390, Applicants' method writes the update of step 340 as a sidefile to the data cache using an Interposed Delay of 1 millisecond per every 25 writes.

In certain embodiments, individual steps recited in FIG. 3 may be combined, eliminated, or reordered.

In certain embodiments, Applicants' invention includes a data management program, such as DFSMS 225, and/or instructions/functions, such as for instructions/functions 234 (FIG. 2), and/or 214 (FIG. 2), where that storage management program is executed by a processor, such as processor 222, and/or where those instructions/functions are executed by a processor, such processor 232 (FIG. 2) and/or processor 212 (FIG. 2), to perform steps 340, 350, 360, 370, 380, and/or 390, recited in FIG. 3.

In other embodiments, Applicants' invention includes instructions residing in any other computer program product, where those instructions are executed by a computer external to, or internal to, system 200, to perform to perform steps 340, 350, 360, 370, 380, and/or 390, recited in FIG. 3. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write data to an information storage and retrieval system comprising (n) volumes and a data cache, wherein said information storage and retrieval system is capable of communicating with one or more host computers, comprising the steps of:

establishing (n) maximum delays, wherein each of said (n) maximum delays is associated with a different one of said (n) volumes, and wherein an (i)th maximum delay is set by a host computer writing data to an (i)th volume, wherein (i) is greater than or equal to 1 and less than or equal to (n);

receiving from a host computer an update for an (i)th volume;

determining an (i)th delay, wherein the (i)th delay is associated with the (i)th volume;

writing said update to said data cache interposing said (i)th delay without making said information storage and retrieval system unavailable to said one or more host computers establishing (m) delay levels, wherein each of said (m) delay levels is associated with a different interposed delay; operative if an (i)th volume update count is not greater than or equal to an (i)th volume update threshold, setting an (i)th delay level, wherein said (i)th delay level comprises one of said (m) delay levels, and wherein the (i)th volume update count comprises the number of sidefiles associated with the (i)th volume written to the data cache;

establishing an (i)th maximum delay level, wherein said (i)th maximum delay level comprises one of said (m) delay levels;

wherein said setting the (i)th delay level step comprises:

calculating a pacing interval by dividing said (i)th volume update threshold by said (i)th maximum delay level;

calculating the (i)th delay level by dividing using integer truncation said (i)th volume update count by said pacing interval.

2. An article of manufacture comprising (n) volumes, a data cache, and an information storage medium having computer readable program code encoded therein to write data to said article of manufacture, wherein said article of manufacture is in communication with one or more host computers, the computer readable program code comprising a series of computer readable program steps to effect:

determining (n) maximum delays, wherein each of said (n) maximum delays is associated with a different one of said (n) volumes, and wherein an (i)th maximum delay is set by a host computer writing data to an (i)th volume, wherein (i) is greater than or equal to 1 and less than or equal to (n);

receiving from said host computer an update for the (i)th volume;

determining an (i)th delay, wherein the (i)th delay is associated with the (i)th volume;

writing said update to said data cache interposing said (i)th delay without making said information storage and retrieval system unavailable to said one or more host computers;

retrieving a predetermined (i)th volume update threshold, wherein the (i)th volume update threshold is associated with the (i)th volume;

retrieving a predetermined (i)th maximum delay;

determining an (i)th volume update count, wherein the (i)th volume update count comprises the number of sidefiles associated with the (i)th volume written to the data cache;

determining if said (i)th volume update count is greater than or equal to the (i)th volume update threshold;

operative if said (i)th volume update count is greater than or equal to the (i)th volume update threshold, setting said (i)th delay to said (i)th maximum delay;

retrieving (m) predetermined delay levels, wherein each of said (m) delay levels is associated with a different interposed delay;

operative if the (i)th volume update count is not greater than or equal to the (i)th volume update threshold, setting the (i)th delay level, wherein said (i)th delay level comprises one of said (m) delay levels;

determining if said (i)th delay level is set to 0;

operative if said (i)th delay level is set to 0, setting said (i)th delay to 0;

retrieving a predetermined (i)th maximum delay level, wherein said (i)th maximum delay level comprises one of said (m) delay levels;

calculating a pacing interval by dividing said (i)th volume update threshold by said (i)th maximum delay level;

calculating the (i)th delay level by dividing said (i)th volume update count by said pacing interval.

3. An information storage medium encoding a computer program product which when executed by a programmable computer processor causes the processor to write data to an information storage and retrieval system, wherein said information storage and retrieval system comprises (n) volumes, a data cache, and a host adapter in communication with a host computer and with said data cache, comprising:

computer readable program code which causes said programmable computer processor to determine (n) maximum delays, wherein each of said (n) maximum delays is associated with a different one of said (n) volumes, and wherein an (i)th maximum delay is set by a host computer writing data to an (i)th volume, wherein (i) is greater than or equal to 1 and less than or equal to (n);

computer readable program code which causes said programmable computer processor to receive from said host computer an update for the (i)th volume;

computer readable program code which causes said programmable computer processor to determine an (i)th delay, wherein the (i)th delay is associated with the (i)th volume;

computer readable program code which causes said programmable computer processor to write said update to said data cache interposing said (i)th delay without making said information storage and retrieval system unavailable to said host computers;

computer readable program code which causes said programmable computer processor to receive said update by said host adapter;

computer readable program code which causes said programmable computer processor to generate an XRC record set;

computer readable program code which causes said programmable computer processor to retrieve (m) predetermined delay levels, wherein each of said (m) delay level is associated with a different interposed delay;

computer readable program code which, if an (i)th volume update count is not greater than or equal to an (i)th volume update threshold, causes said programmable computer processor to set the (i)th delay level, wherein said (i)th delay level comprises one of said (m) delay levels, and wherein the (i)th volume update count comprises the number of sidefiles associated with the (i)th volume written to the data cache;

computer readable program code which causes said programmable computer processor to determine if said (i)th delay level is set to 0;

computer readable program code which, if said (i)th delay level is set to 0, causes said programmable computer processor to set said (i)th delay to 0;

computer readable program code which causes said programmable computer processor to retrieve a predetermined (i)th maximum delay level, wherein said (i)th maximum delay level comprises one of said (m) delay levels;

wherein said computer readable program code which causes said programmable computer processor to set the (i)th delay level further comprises:

computer readable program code which causes said programmable computer processor to calculate a pacing interval by dividing said (i)th volume update threshold by said (i)th maximum delay level;

computer readable program code which causes said programmable computer processor to calculate the (i)th delay level by dividing using integer truncation said (i)th volume update count by said pacing interval.

* * * * *